United States Patent

[15] 3,642,254

Ternes

[45] Feb. 15, 1972

[54] MEANS FOR CONVEYING, DISCHARGING AND MIXING LIVESTOCK FEEDS

[72] Inventor: Jacob M. Ternes, 202 North Second, Conway Springs, Kans. 67031

[22] Filed: June 16, 1970

[21] Appl. No.: 46,766

[52] U.S. Cl. .......................... 259/46, 259/97, 259/DIG. 31
[51] Int. Cl. ........................................................ B01f 7/08
[58] Field of Search ...................... 259/9, 10, 25, 26, 45, 46, 259/97, 68, 69; 214/522; 222/227

[56] References Cited

UNITED STATES PATENTS

| | | | |
|---|---|---|---|
| 2,572,099 | 10/1951 | Bateman | 214/522 |
| 2,849,137 | 8/1958 | Hansen | 214/522 |
| 3,070,264 | 12/1962 | Christy | 222/227 |
| 3,168,291 | 2/1965 | Knoedler | 259/97 |
| 3,215,408 | 11/1965 | Hansen | 259/97 |

*Primary Examiner*—Robert W. Jenkins
*Attorney*—Robert E. Breidenthal

[57] ABSTRACT

A wheeled ensilage wagon provided with a grain box detachably mounted externally thereon, with means provided for delivering from the wagon and box an adjustably proportioned mixture of the wagon and box contents. The delivery means receives contents from the wagon by wagon discharge means that includes a discharge auger in the wagon that is drivingly connected to the drive for an oscillatory agitator disposed thereabove. The delivery means also receives contents from the box by wagon discharge means that includes a box discharge auger in the box that feeds the box contents to the delivering means via a rotary metering means. The box is provided with an oscillatory agitator disposed above the auger therein. The drives of metering means, auger and agitator are interconnected for concurrent operation, and means is provided for detachably coupling the shaft of the agitator of the wagon to such drives so that the metering means is driven at a rate proportional to rate of operation of the auger in the wagon. The wagon and the auger therein are adapted to be detachably coupled respectively to the tow bar and the power takeoff of a tractor.

19 Claims, 9 Drawing Figures

INVENTOR.
JACOB M. TERNES
BY
Robert E Breidenthal
ATTORNEY

INVENTOR.
JACOB M. TERNES
BY
*Robert E. Breidenthal*
ATTORNEY

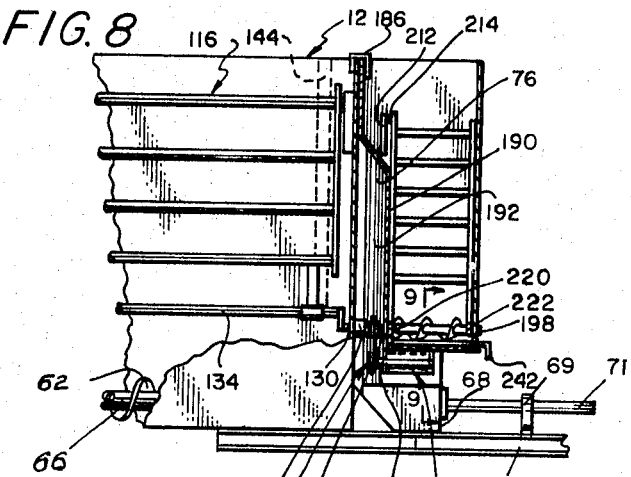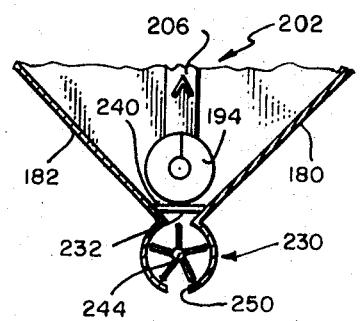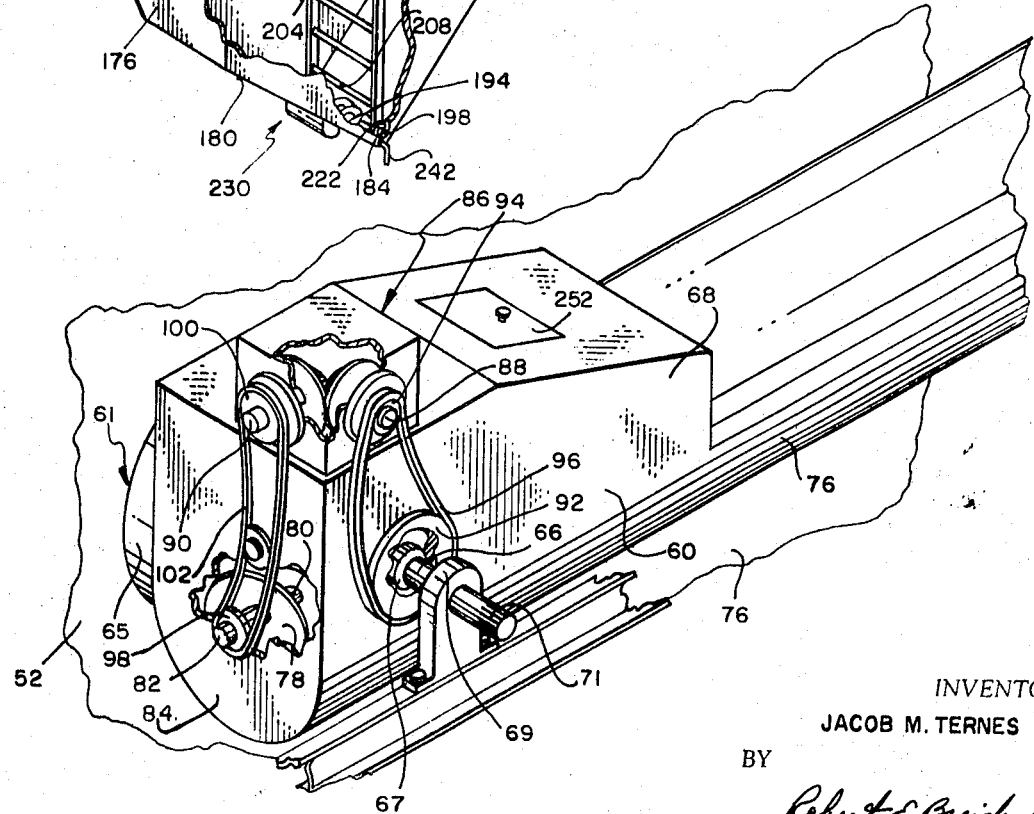

MEANS FOR CONVEYING, DISCHARGING AND MIXING LIVESTOCK FEEDS

The present invention relates to new and useful improvements in ensilage wagons, and pertains particularly to new and useful improvements in apparatus for discharging the wagon of its contents. The invention also encompasses new and useful improvements for introducing grain or the like into the stream of ensilage being discharged from the wagon at a rate proportional to the rate of ensilage discharge.

The invention is concerned with effecting improvements upon prior art proposals such as exemplified by the following U.S. patents:

U.S. Pat. No. 2,751,058, entitled Vehicle Mounted Grain Mixer and Conveyor, which issued June 19, 1956 to Reiter.

U.S. Pat. No. 2,849,137, entitled Tractor Mounted Power Feeder For Bunk Feeding, which issued Aug. 26, 1958 to Hansen.

U.S. Pat. No. 3,070,264, entitled Machine For Dispensing and Distributing Comminuted Materials, which issued Dec. 25, 1962 to Christy.

One of the greatest problems encountered in the use of apparatus heretofore employed or proposed resides in the difficulty of discharging materials such as ensilage, rolled grain and the like because of their extremely variable flow characteristics, and because of the tendency of such materials to adhere under various conditions of moisture content. These problems are greatly aggravated when the materials are frozen or are partially frozen.

Accordingly, it is the paramount object of the invention to enable the controlled discharge of materials such as ensilage of various types and fineness of cutting, rolled grain, and the like, from a container thereof under widely varying conditions of moisture content and when the material is unfrozen, partially frozen or entirely frozen.

Another important object of the invention is to enable the concurrent discharge and proportional mixing of differing materials such as ensilage and rolled grain from separate containers thereof, with the proportionality factor being adjustable.

Yet another important object of the invention is to cause materials such as ensilage and rolled grain to fall or be moved downwardly into a horizontal auger therebelow for the entire axial extent of the auger.

A broad aspect of the invention involves in a feedbox of the type having downwardly convergent sidewalls joined by a bottom wall, front and rear end walls, and having a discharge opening adjacent the juncture of one of the end walls with the bottom wall; the improvement of the combination therewith of a rotatable auger means in the bottom of the box extending between the end walls of the latter, an upstanding generally rectangular agitator frame disposed above the auger means and extending between the front and rear end walls of the box, said agitator frame having front and rear ends, said front and rear end walls and the upper portions of the front and rear ends of the agitator frame being provided with coacting means for guiding vertical movement of such agitator frame portions, connecting means carried by the box and operatively coupled to the agitator frame for moving the bottom of the agitator frame to travel in a circular path about an axis spaced above and generally parallel to the axis of the auger means, and means for actuating the auger means and the connecting means.

Another broad aspect of the invention involves in an ensilage wagon of the type having front and rear end walls, with one of such walls having a discharge opening, the combination therewith of an improved means for discharging the contents of the wagon through the discharge opening comprising a rotatable auger means in the bottom of the wagon, said auger means having a generally horizontal axis in substantial alignment with the discharge opening and extending between the end walls, an upstanding generally rectangular agitator frame disposed above the auger means and extending between the front and rear end walls of the wagon, said agitator frame having front and rear ends, said front and rear end walls and the upper portions of the front and rear ends of agitator frame being provided with coacting means for guiding vertical movement of such agitator frame portions, connecting means carried by the wagon and operatively coupled to the agitator frame for moving the bottom of the agitator frame to travel in a circular path about an axis spaced above and generally parallel to the axis of the auger means, and means for actuating the auger means and the connecting means.

The paramount feature of the invention resides in the provision of an upstanding oscillatory agitator above a horizontal auger, with the upper portion of the agitator being constrained to move substantially solely vertically while the bottom portion of the agitator is driven to travel in a circular path about an axis parallel to the auger, whereby the agitator sweeps a space of an inverted V-configuration. This feature is especially desirable when the container of the material has downwardly convergent side walls so as to be of an upright V-configuration encompassing the inverted V-shaped space swept by the agitator.

Another important feature of the invention resides in the rotary metering means associated with the discharge of an auxiliary container of feed supplement being driven at a rate proportional to the rate at which the discharge auger of the primary container is driven.

Yet another feature of importance resides in the augers of the ensilage wagon and of the swivelly mounted chute being radially offset from each other and overlapping with the former being uppermost, so that any tendency for the material to become clogged or packed at the change in the travel path of the material is eliminated or minimized.

These and other objects, aspects and features of the invention will become manifest in the light of the ensuing description of a preferred embodiment of the invention, which description is given in conjunction with the accompanying drawings illustrative thereof, wherein:

FIG. 6 is an enlarged isometric detail view of the swiveled connection of the delivery chute to the wagon with parts broken away to illustrate the relationship of augers of the wagon and of the chute to each other and the drive connection therebetween;

FIG. 7 is an isometric view of the auxiliary grain box, with portions being broken away to reveal hidden parts thereof;

FIG. 8 is a side elevational view of the front portion of the ensilage wagon with the auxiliary box mounted thereon, with portions being broken away and portions being shown in dashed outline to reveal hidden features; and, FIG. 9 is a sectional view taken upon the plane of the section line 9—9 in FIG. 8.

Figures 1, 4:
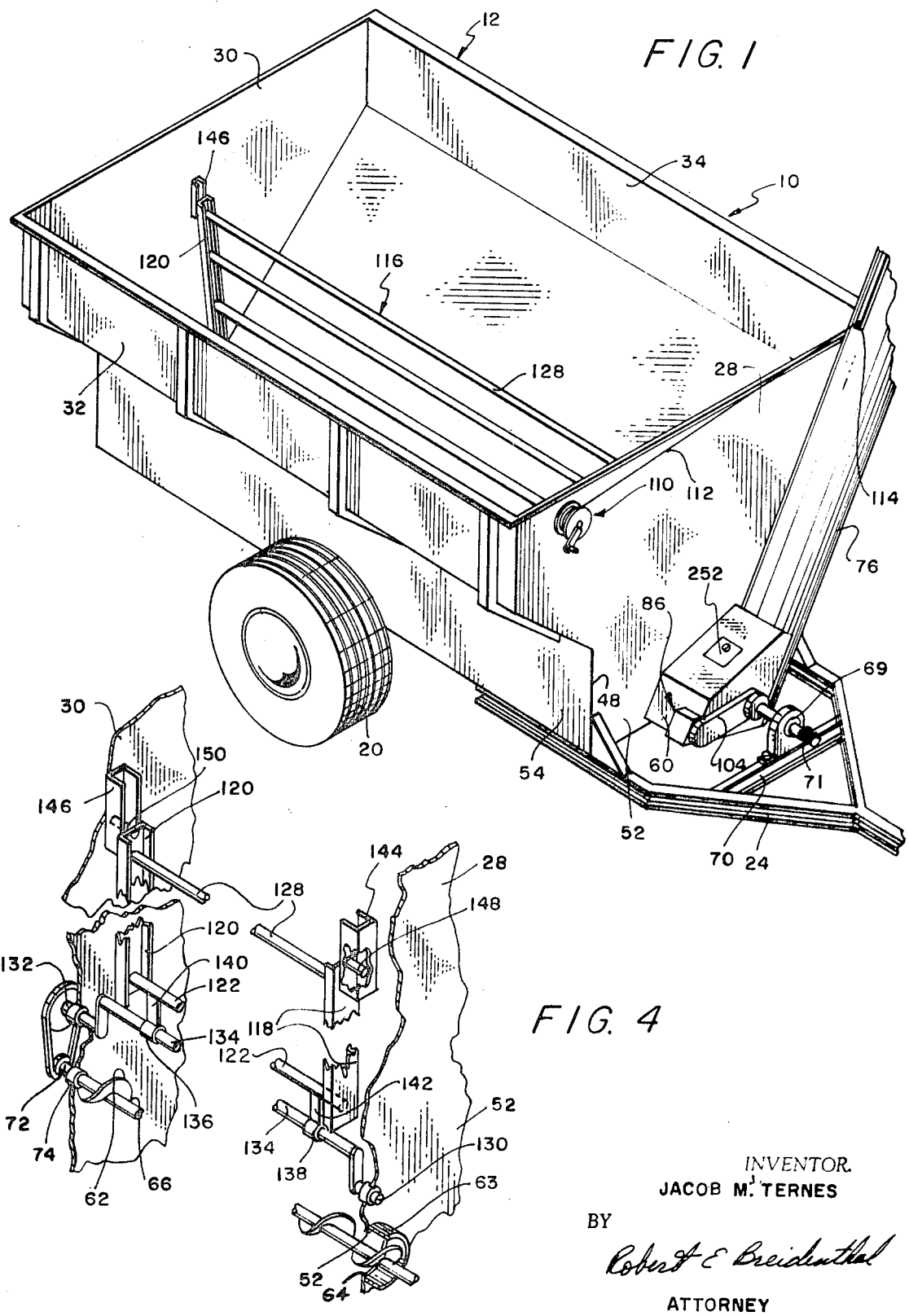
FIG. 1 is a isometric view of the ensilage wagon.
FIG. 4 is an enlarged and fragmented isometric view of the drive and guide means of the agitator and the driving connection of the auger to the agitator.

Referring now to the drawings wherein like numerals designate like parts throughout the various views, the reference numeral 10 designates the ensilage wagon generally. Except as hereinafter pointed out specifically, the ensilage wagon 10 is conventional and includes an open-topped ensilage container designated generally at 12 that is at a position intermediate its forward and rearward extent supportingly mounted at 14 and 16 upon an axle 18 that is at its opposite ends provided with rotatable ground support wheels 20 and 22, as best shown in FIG. 3.

The container or box 12, which is preferably fabricated of steel, has attached to the forward end thereof in any suitable manner, such as by welding or the like, a forwardly projecting tongue 24. The tongue 24 terminates at its forward extremity in conventional means 26 adapted for detachable coupling to the tow bar of a draft vehicle such as a tractor or the like, not shown.

The container or ensilage box 12 includes front and rear ends walls 28 and 30, respectively, and sidewalls 32 and 34.

Figure 3:
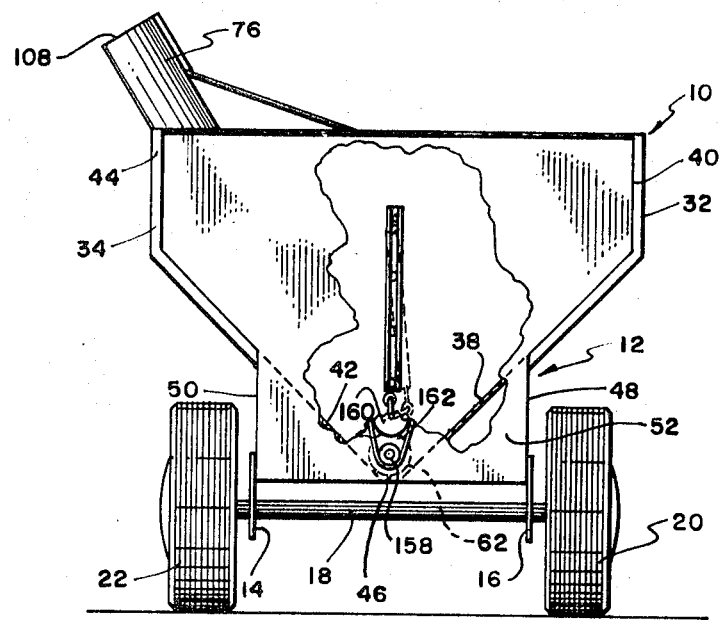
FIG. 3 is a rear elevational view of the ensilage wagon, with portions being broken away to reveal hidden parts, and with the agitator being shown in dashed outline in a position moved by the full line position shown thereof.
Figure 5:
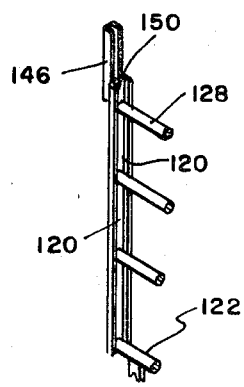
FIG. 5 is an enlarged isometric detail view of one of the vertical agitator guiding structure.

As best shown in FIG. 3, the sidewall 32 includes a downwardly inclined lower portion 38 and a vertical upper portion 40. Similarly, the sidewall 34 includes a downwardly inclined lower portion 42 and a vertical upper portion 44. The downwardly convergent lower portions 38 and 42 of the sidewalls 32 and 34 are joined by an arcuate wall section 46 which may be termed the bottom wall. It will be understood that the sidewalls 32 and 34 including the wall section 46 may be integral and formed from a single piece of sheet steel. The sidewalls 32 and 34 are symmetrical to each other, and the forward and rear extremities thereof as well as the forward and rear extremities of the wall section 46 are rigidly attached in any suitable manner, such as by welding or the like, not shown, to the adjacent faces of the vertical end walls 28 and 30.

It will be noted that the overall configurations of the sidewalls 32 and 34 are such as to define generally in transverse section an upright V-configuration, and this is especially true with respect to the lower portions 38 and 42 of such sidewalls.

For the purpose of imparting strength and rigidity to the wagon 10, the central portions of the end walls 28 and 30 are extended downwardly below the sidewall portions 38 and 42 and the connecting wall section 46, as clearly shown in FIGS. 1 and 3, and the lateral vertical edges 48 and 50 of the downwardly extending portions 52 of the end wall are connected with vertical sideplates such as the one designated at 54 in FIG. 1. The upper edges of the vertical sideplates 54 abut and are preferably welded to the undersides of the sidewall portions 38 and 42. Such sideplates 54 lend stability and strength to the wagon 10 and it is such plates 54 that are directly attached to the axle 18 and the tongue 24.

A housing 60 is swively or rotatably mounted on the lower portion 52 of the front wall 28 by means 61 for oscillatory movement about the horizontal axis of an auger 62 disposed in the box 12 immediately above the bottom wall section 46. The mounting means 61 entails the lower portion 52 of the wall 28 having an opening 64 therethrough, with a short length of tubing or sleeving 63 being welded to the wall portion 52 about the opening 64 to project a short interval forwardly thereof. The helical part of the auger 62 extends into and is coterminous with the forward end of the tube 63, while the shaft 64 of the auger 62 extends forwardly through the housing 60 as will be presently explained. The means 61 includes the housing 60 having a rearwardly extending tubular portion 65 integral therewith, with it being understood that the tube 65 of the housing 60 opens into the interior of the housing 60 in a manner analogous to the tube 63 opening into the box 12 through the opening 64. The tube 65 is larger than the tube 63 and slidingly and rotatably embraces the latter.

Figure 2:
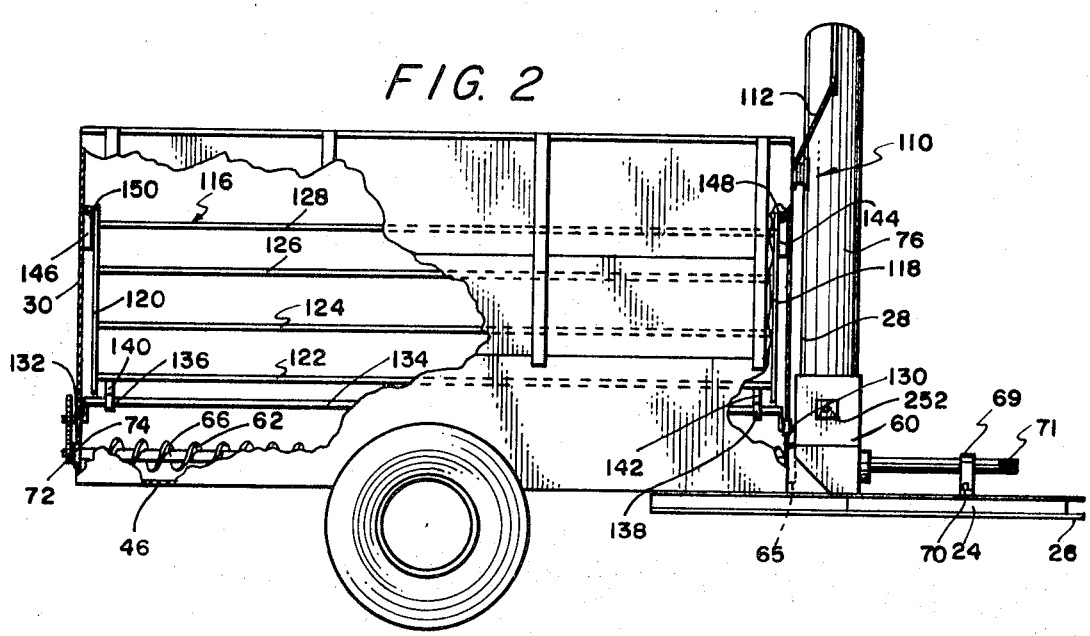
FIG. 2 is a side elevational view of the ensilage wagon, shown with portions broken away and portions shown in dashed lines to reveal hidden parts.

The shaft 66 of the auger 62 extends through and forwardly of the housing 60, and is journaled through a bearing 67 in the front wall 68 of the housing 60. The auger shaft 66 is forwardly extended through a bearing 69 mounted on an integral crossmember 70 of the tongue 24 and terminates in a forward end portion 71 that is splined or otherwise adapted for being drivingly coupled to the power takeoff of the towing vehicle or tractor, not shown, coupled to the tongue 24, as will be well understood by those skilled in the art. Needless to say, coupling the tongue 24 to a towing vehicle tow bar will support the wagon 10 in the horizontal position shown thereof in FIG. 2.

The rear end 72 of the auger shaft 62 extends through and is journaled through the rear wagon wall 30 as shown at 74.

A discharge or delivery chute 76 is fixed to the housing 60 for oscillatory movement therewith and an auger 78 is rotatably mounted in the chute 76, such auger 78 extending into the housing 60 so as to be radially spaced from and disposed below the forward end of the auger 62 within the housing 60 as clearly shown in FIG. 6. The shaft 80 of the auger 78 has an end portion 82 projecting through and journaled through an end wall 84 of the housing 60. Gearbox means 86 is mounted on top of the housing 60, such means 86 having input and output shafts 88 and 90 at right angles to each other. Pulleys 92 and 94 are fixed to the shafts 66 and 88 and connected by an endless belt 96, whereby the input shaft 88 is driven by the shaft portion 66 of the auger shaft 66. Similarly, the shafts 82 and 90 are provided with pulleys 98 and 100 connected by an endless belt 102, whereby the auger shaft portion 82 is driven from the shaft 90, with the latter being driven from the input shaft 88. Preferably the described pulley and belt drives are encased in protective housing such as indicated at 104 in FIG. 1.

As thus far described, driving the auger 62 by driving the exposed forward end shaft portion 66 thereof is accompanied by the auger 78 being driven. Thus the auger 62 can transport or move material from the bottom of the box 12 into the housing 60, wherein it falls into the auger 78 and is thence moved through the chute 76 by the auger 78 to be discharge from the free end of the chute 76. The free end 108 of the chute is not shown as so provided, but it is deemed well within the skill of the art to provide the same with a conventional swiveled elbow or the like if deemed necessary or expedient.

The chute 76 can be moved between a relatively vertical and any desired discharge attitude by means of a latchable reel means 110 mounted on the front wall 28, such reel means 110 including a rope or lightweight wire cable 112 wound thereon having a free end 114 secured to the chute 76.

An agitator means 116 is provided in the box 12, such means 116 comprising a generally rectangular steel agitator frame comprised of a pair of spaced upright members 118 and 120 that are rigidly connected by a plurality of vertically spaced horizontal elements 122, 124, 126 and 128.

The agitator frame is generally vertically disposed, directly overlies the auger 62, and is disposed between the downwardly convergent sidewalls 32 and 34 of the box.

Crank means is provided for moving the lower portion of the agitator frame in a circular path about an axis parallel to the axis of the auger 62. Such crank means comprises an elongated crankshaft having opposite end portions 130 and 132 respectively journaled through the front and rear end walls of the box 12, respectively, with the intermediate and offset portion 134 of the crankshaft being journaled through spaced bearing 136 and 138 fixed to the lowermost agitator frame element 122 by brackets 140 and 142 respectively.

Means is provided to guide or constrain the upper portion of the agitator frame to substantially solely vertical movement. Such means comprises guide channels 144 and 146 fixed to the adjacent sides of the front and rear end walls 28 and 30, respectively, and pins 148 and 150 fixed to the upper end portions of the frame members 118 and 120 to project into the guide channels 144 and 146 for slidingly guided movement therein.

The crankshaft is driven from the auger shaft 66 by means comprising sprockets 158 and 160 fixed to the shaft portions 72 and 132, and a drive chain 162 entrained thereover. Thus, driving of the augers 62 and 78 is accompanied by the crankshaft being driven at a directly proportional speed.

Rotation of the crankshaft compels the bottom of the agitator frame to travel in a circular path while the top thereof moves vertically. Consequently, the agitator sweeps a space of an inverted V-configuration that involves both vertical and horizontal motion of the lower portions of the agitator frame. This motion of the agitator frame tends to work a V-shaped cavity into the ensilage from the sides of which material tends to fall or slough off rather readily into the auger especially as the agitator frame moves to work up or down against the side faces of the cavity. The result is that materials that are particularly vexing because of their tendency to bridge over an auger and not feed thereinto are prevented from bridging and continue to feed into the auger. This beneficial result seems to be even further enhanced when the sidewalls are downwardly convergent so that the horizontal thickness of the bed of material is quite thin adjacent the bottom of the zone of movement of the agitator frame, and can be of only slight supporting strength. Also such sidewall configuration can be conducive to the agitator frame causing some upward and downward movement of the material along such walls. It will be noted that the agitator always travels upwardly in its nearest approach to one sidewall and downwardly in its nearest approach to the other sidewall, so that material at one side is periodically urged down toward the auger, while the material at the other side is periodically urged upwardly into a gravitational less stable position.

To the extent that the zone swept by the agitator frame is not void of material, the horizontal elements 122–128 are forced to work about in such material so as to break it up into a free running condition that will readily feed into the auger 62.

It has been found in actual tests of the equipment that no difficulty has been experienced in unloading or discharging ensilage from the apparatus thus far described after the same had been exposed for protracted periods to subfreezing temperatures. The test conditions were such that failures are generally the rule in the use of other forms of extant apparatus.

Reference is now made of FIGS. 7, 8 and 9 illustrative of auxiliary equipment that can be employed with the apparatus thus far described. Such auxiliary equipment comprises a grain box 170 detachably mountable on the front end wall 28 of the wagon 10 as shown in FIG. 8. The grain box 170 comprises front and rear end walls 172 and 174, and sidewalls 176 and 178 that include downwardly convergent lower portions 180 and 182 that are joined by an arcuate bottom wall section 184. The top edge of the rear wall 174 is provided with a pair of hooks 186 and 188 that are detachably engageable over the top edge of the front wall 28.

The lower portion 190 of the rear wall 174 is forwardly offset to afford a space 192 between the end wall 28 and the grain box 170. An auger 194 is disposed in the bottom of the box 170 and opposite end portions 196 and 198 of its shaft are journaled through the walls 190 and 172 respectively. The auger shaft 196 is in alignment with the crankshaft end portion 130, and conventional means 198 detachably couple the adjacent ends of the shafts 130 and 196, whereby the auger 194 is driven from the crankshaft 130 when such shafts are coupled and whereby it is evident that the auger 194 is driven at a rate proportional to the rate of rotation of the auger 64.

To assure material in the grain box, which can be a livestock feed supplement such as rolled wheat, oats and the like, being fed into the auger 194, an agitator means 200 quite similar to the agitator means 116 is provided in the box 170. Such agitator means 200 comprises an agitator frame 202 formed of a pair of upstanding members 204 and 206 rigidly connected by a plurality of vertically spaced elements such as those indicated at 208 and 210. A vertical channel member 212 is suitably mounted on the front wall 174 and the same slidingly and guidingly receives a pin 214 fixed to the upper end of the frame member 204. Such structure constrains the upper end of the agitator frame 202 to move vertically. As the length of the agitator frame 202 is relatively short, the provision of a complementary guide means for the forward end thereof can be omitted; however, such means can be provided if deemed necessary or expedient as will be obvious, especially in view of the guide means provided at both the front and rear ends of the previously described agitator means 116.

As in the case of the agitator means 116, means is provided to move the bottom portion of the agitator frame 202 in a circular path about an axis parallel to the auger 194. Such means in this instance comprises the auger 194 having spaced circular eccentrics 220 and 222 fixed to the shaft thereof, with such eccentrics 220 and 222 being journaled through the lower ends of the agitator frame members 204 and 206.

The function of the agitator means 200 and the results realized thereby are essentially the same as those previously described in connection with the agitator means 116, and no further description or explanation is deemed necessary to an appreciation thereof.

A conventional rotary vane-type metering means 230 is mounted on the bottom of the box 170 to receive material from the latter through an opening 232 in the bottom wall section 184. The auger 194 is driven to urge material to a position for free gravitational descent through the opening 232 into the metering means 230. The metering means 230 is conventional and the rate of passage of material therethrough is, as is well known, proportional to the rate of its rotation and to a factor dependent upon the axial extent of the opening 232. In accordance with usual arrangements, a slidable gate or valve plate 240 is mounted at the juncture of the metering means 230 with the box 170 whereby the effective axial extent of the opening can be varied as desired. A gate control rod 240 is connected to the gate for positioning the latter as desired.

The vaned rotary element 244 of the metering means 230 has an exposed portion 246 of the drive shaft thereof drivingly coupled to the auger shaft portion 196 by a belt and pulley means designated generally at 248, whereby the rate of rotation of the rotary element 244 is directly proportional to the rate of rotation of the auger 194, and most importantly, at a rate directly proportional to the rate of rotation of the auger 64.

The outlet 250 of the metering means 230 is arranged to discharge into the housing 60 through an opening in the latter that is normally closed by a removable cover plate 252. Material introduced into the housing 60 from the box 170 via the metering means 230 will commingle with material entering the housing 60 from the box 12 and pass therewith through the chute 76 while becoming thoroughly mixed therewith during such passage by the action of the auger 78.

Due to the constancy of the feed of material into the auger 62 realized by the effectiveness of the agitator means 116, the rate of introduction of material from the box 12 into the housing 60 and chute 76 is roughly proportional to the rate of rotation of the auger 64.

Since the rate of delivery of material from the box 170 is directly proportional to the rate of rotation of the auger 62 (with a proportionality factor controlled by the gate), a controlled proportion of the contents of the boxes 12 and 170 is mixed and delivered from the chute 76.

The preferred material of construction is steel throughout, except where the use of other materials is plainly indicated (as for example, the tires, etc.) and the preferred mode of fabrication is by welding or riveting.

I claim:

1. In an ensilage wagon of the type having front and rear end walls, with one of such walls having a discharge opening, the combination therewith of an improved means for discharging the contents of the wagon through the discharge opening comprising a rotatable auger means in the bottom of the wagon, said auger means having a generally horizontal axis in substantial alignment with the discharge opening and extending between the end walls, an upstanding generally rectangular agitator frame disposed above the auger means and extending between the front and rear end walls of the wagon, said agitator frame having front and rear ends, said front and rear and walls and the upper portions of the front and rear ends of agitator frame being provided with coacting means for guiding vertical movement of such agitator frame portions, connecting means carried by the wagon and operatively coupled to the agitator frame for moving the bottom of the agitator frame to travel in a circular path about an axis spaced above and generally parallel to the axis of the auger means, and means for actuating the auger means and the connecting means.

2. The combination of claim 1, together with means establishing a driving relationship between the auger means and the connecting means for making the rates of operation of the auger and connecting means proportional to each other.

3. The combination of claim 1, wherein the connecting means comprises a crankshaft having a rotary connection to a bottom portion of the agitator frame and extending between the end walls, said crankshaft having radially offset end portions, and the end walls of the wagon being provided with means for rotatably supporting the end portions of the crankshaft.

4. The combination of claim 3, wherein the auger means includes a rotatable drive shaft, and means establishing a driving connection between one of the crankshaft end portions and the drive shaft of the auger means.

5. The combination of claim 1, wherein the agitator frame is comprised of a pair of spaced upright end members, and a plurality of vertically spaced frame members extending between and connecting the upright end members.

6. The combination of claim 5, wherein the coacting means comprises each of the end walls being provided with means defining a vertical guide channel, and each of the upper end portions of the agitator frame including an element slidingly and guidingly received in the guide channel of the end wall nearest thereto.

7. The combination of claim 6, wherein the connecting means comprises a crankshaft having a rotary connection to a bottom portion of the agitator frame and extending between the end walls, said crankshaft having radially offset end portions, the end walls of the wagon being provided with means for rotatably supporting the end portions of the crankshaft, said auger means including a rotatable drive shaft, and means establishing a driving connection between one of the crankshaft end portions and the drive shaft of the auger means, and said wagon having downwardly converging sidewalls, whereby the transverse vertical configurations of the interior of the wagon and of the space swept by the agitator frame are respectively of generally upright and inverted V-shapes.

8. The combination of claim 1, wherein the wagon has downwardly converging sidewalls, whereby the transverse vertical configurations of the interior of the wagon and of the space swept by the agitator frame are respectively of generally upright and inverted V-shapes.

9. The combination of claim 1, wherein the coacting means comprises each of the end walls being provided with means defining a vertical guide channel, and each of the upper end portions of the agitator frame including an element slidingly and guidingly received in the guide channel of the end wall nearest thereto.

10. The combination of claim 1, including a discharge housing means for receiving ensilage from the wagon through the discharge opening, means for swivelly mounting the discharge housing means on said one end wall for swinging movement about the axis of said auger means, said discharge housing means being provided with an elongated discharge chute, a second rotatable auger means in said chute, and means establishing a driving connection between the first-mentioned auger means and said second auger means.

11. The combination of claim 10, wherein the second auger means has an axis that is offset from and, within the discharge housing means, passes below the axis of the first-mentioned auger means, whereby ensilage moved by the first-mentioned auger means can move laterally into the second auger means under the influence of gravity.

12. The combination of claim 11, including a grain box carried by the wagon at a position above the discharge housing means, and means for discharging grain from the grain box and into the discharge housing means at a rate proportional to the rate of rotation of the first-mentioned auger means.

13. The combination of claim 12, including means for controlling the proportionality factor.

14. The combination of claim 12, wherein the means for discharging grain from the grain box includes a rotary metering means for delivering grain therethrough at a rate proportional to its rate of rotation, and means for rotating the metering means at a rate proportional to the rate of operation of the first-mentioned auger means.

15. The combination of claim 14, including means for detachably mounting the grain box on the wagon, said grain box having an outlet in the bottom thereof overlying and communicating with the metering means, a third auger means in the grain box for urging grain to a position above the outlet, a grain agitator means in the box above the third auger means, means establishing a driving connection between the third auger means and the grain agitator means, and means detachably coupling the first-mentioned auger means to the third auger means for driving the latter from the former.

16. In a grain box of the type having downwardly convergent sidewalls joined by a bottom wall, front and rear end walls, and having a discharge opening adjacent the juncture of one of the end walls with the bottom wall; the improvement of the combination therewith of a rotatable auger means in the bottom of the box extending between the end walls of the latter, an upstanding generally rectangular agitator frame disposed above the auger means and extending between the front and rear end walls of the box, said agitator frame having front and rear ends, one of said end walls and an upper portion of the agitator frame being provided with coacting means for guiding vertical movement of such agitator frame portion, connecting means operatively coupling the auger means to the agitator frame for moving the bottom of the agitator frame to travel in a circular path about an axis spaced above and generally parallel to the axis of the auger means, and means for actuating the auger means and the connecting means.

17. The combination of claim 16, wherein the connecting means comprises an eccentric fixed to the auger means and having a journal connection to the agitator frame.

18. The combination of claim 16, including a rotary metering means arranged to receive grain discharged from the box through the discharge opening, and means establishing a driving connection between the auger means and the metering means.

19. The combination of claim 18, including means for adjustably obstructing the discharge opening.

* * * * *